(12) United States Patent
Bohringer et al.

(10) Patent No.: US 7,670,968 B2
(45) Date of Patent: Mar. 2, 2010

(54) FUNCTIONAL TEXTILE MATERIAL PROVIDED WITH MICROCAPSULES CONTAINING AN ACTIVE INGREDIENT AND USE THEREOF

(75) Inventors: Bertram Bohringer, Wuppertal (DE); Michael Klemund, Düsseldorf (DE)

(73) Assignee: Blucher GmbH, Erkrath (DE)

( * ) Notice: Subject to any disclaimer, the term of this patent is extended or adjusted under 35 U.S.C. 154(b) by 799 days.

(21) Appl. No.: 11/521,275

(22) Filed: Sep. 14, 2006

(65) Prior Publication Data

US 2007/0065658 A1 Mar. 22, 2007

(30) Foreign Application Priority Data

Sep. 16, 2005 (DE) .................. 10 2005 044 504

(51) Int. Cl.
*B32B 27/04* (2006.01)
(52) U.S. Cl. .................................... 442/131
(58) Field of Classification Search ............... 442/131; 428/195.1, 197, 198, 402, 402.2
See application file for complete search history.

(56) References Cited

U.S. PATENT DOCUMENTS

| | | | |
|---|---|---|---|
| 4,610,905 A | 9/1986 | Von Blucher et al. | 428/90 |
| 4,774,133 A | 9/1988 | Doree et al. | 428/321.5 |
| 4,990,392 A | 2/1991 | Groshens et al. | 428/196 |
| 5,277,963 A | 1/1994 | Von Blucher et al. | 428/206 |
| 5,334,436 A | 8/1994 | Hobbs et al. | 428/195 |
| 5,605,746 A | 2/1997 | Groeger et al. | 442/347 |
| 6,524,375 B2 | 2/2003 | Brun | 96/222 |
| 2002/0193028 A1 | 12/2002 | Zuckerman et al. | 442/328 |
| 2003/0054141 A1 | 3/2003 | Worley et al. | 428/195 |
| 2004/0011989 A1 | 1/2004 | Lin et al. | 252/8.61 |
| 2005/0227047 A1 | 10/2005 | Sutter et al. | 428/195.1 |
| 2005/0266749 A1 | 12/2005 | De Ruiter | 442/59 |

FOREIGN PATENT DOCUMENTS

| | | |
|---|---|---|
| DE | 33 41 995 A1 | 5/1984 |
| DE | 42 05 648 A1 | 8/1993 |
| DE | 42 06 443 C1 | 8/1993 |
| DE | 689 14 482 T2 | 9/1994 |
| DE | 198 50 997 A1 | 5/2000 |
| DE | 102 61 996 A1 | 3/2004 |
| DE | 101 19 481 B4 | 6/2004 |
| EP | 0 436 729 A1 | 7/1991 |
| EP | 0 818 230 A1 | 1/1998 |
| EP | 1 279 435 A1 | 1/2003 |
| EP | 1 387 995 B1 | 2/2006 |
| WO | WO 93/24241 A1 | 12/1993 |
| WO | WO 00/05970 A1 | 2/2000 |
| WO | WO 2004/107818 A1 | 12/2004 |
| WO | WO 2005/018795 A1 | 3/2005 |

*Primary Examiner*—Arti Singh-Pandey
(74) *Attorney, Agent, or Firm*—Woodard, Emhardt, Moriarty, McNett & Henry LLP

(57) ABSTRACT

The subject of the invention is a functional textile material (1), wherein the functional textile material (1) comprises a textile backing (2) in the form of a two-dimensional textile formation, and the textile backing (2) is provided with microcapsules (3), which contain at least one active ingredient, and the microcapsules (3) are secured to the textile backing (2) by means of an adhesive (4) applied discontinuously to the textile backing (2). In this way, one obtains a functional textile material (1) with high air-permeability and high water vapor-permeability at reduced basis weight, which material can be used in particular for making functional clothing.

24 Claims, 1 Drawing Sheet

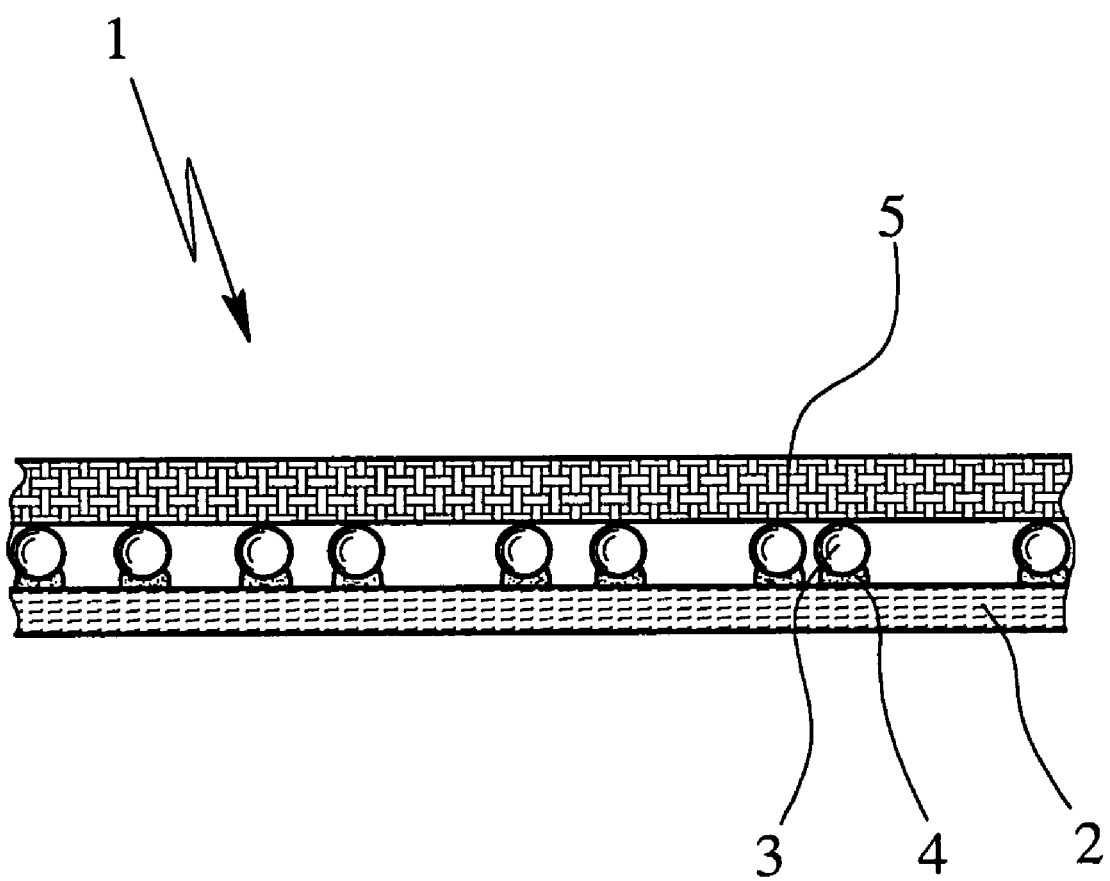

FUNCTIONAL TEXTILE MATERIAL PROVIDED WITH MICROCAPSULES CONTAINING AN ACTIVE INGREDIENT AND USE THEREOF

CROSS-REFERENCES TO RELATED APPLICATIONS

This application claims priority to German Patent Application No. DE 10 2005 044 504.7, filed Sep. 16, 2005, entitled "FUNCTIONAL TEXTILE MATERIAL PROVIDED WITH MICROCAPSULES CONTAINING AN ACTIVE INGREDIENT AND USE THEREOF", which is expressly incorporated by reference herein, in its entirety.

BACKGROUND OF THE INVENTION

The present invention concerns a functional textile material provided or coated with microcapsules containing an active ingredient, according to the specification and claims, as well as the use thereof to make garments, as well as protective materials of all kinds, and furthermore to make filters and filter materials of all kinds. Moreover, the present invention concerns garments and protective materials, as well as filters and filter materials, which are made using the aforesaid functional textile material.

Currently, active ingredients of all kinds can also be incorporated into textiles. For example, this can be done by the corresponding active ingredients being spun into the fibers. In this way, however, one often achieves only an inadequate concentration of the active ingredient. Moreover, a controlled release is not always assured.

Furthermore, active ingredients can also be introduced, as an alternative, in so-called microcapsules; the purpose of encapsulation is to firmly enclose the active ingredients, so that a certain dosage can be locally achieved. Essentially, there are two different kinds of microcapsules for this purpose, namely, matrix encapsulation on the one hand, and core/shell encapsulation on the other hand. In order to deploy the active ingredients in a specific manner, the microcapsules must be applied to the textiles. This is often achieved today in that the microcapsules are embedded in complex composite materials, which then become part of the textiles. As an alternative, the microcapsules are often introduced into coatings, especially polyurethane coatings, which are then applied over the entire surface of the textiles, so that the textiles lose at least part of their permeability to air and the releasing of the active ingredient cannot always be controlled.

Thus, there has been no shortage of attempts to provide textiles with active ingredients that are released in a controlled manner at a desired time or that deploy their action at a desired time. Thus far, this problem has not been sufficiently solved in the prior art.

It is therefore the problem of the present invention to furnish a functional textile material which at least largely avoids or at least mitigates the previously described drawback of the prior art. In particular, such a textile material should be suitable for diversified uses, in particular, for the making of garments and protective materials of every kind, as well as filters and filter materials of every kind.

In particular, one problem of the invention is to furnish a functional textile material provided or coated with microcapsules containing an active ingredient, which on the one hand has a good breathing activity, especially a good gas- and/or water-vapor permeability, and on the other hand can release or deploy the active ingredients at a desired place and/or at a desired time.

To solve the above-described problems, the present invention proposes a functional textile material. Additional advantageous embodiments of the invented functional textile material are disclosed in the specification and are the subject of the dependent claims.

Another objective of the present invention is the use of the functional textile material according to the present invention, especially for the making of garments, as well as protective materials of every kind, and filters as well as filter materials of every kind.

Finally, another object of the present invention concerns the garments and protective materials, as well as filters and filter materials, made with the functional textile material of the invention.

The object of the present invention is—according to a first aspect of the present invention—therefore a functional textile material, wherein the functional textile material comprises a textile backing, which is provided or coated with microcapsules, wherein the microcapsules contain at least one active ingredient, wherein one of the characteristics of the present invention is to make sure that the microcapsules are secured to the textile backing by means of an adhesive applied discontinuously to the textile backing.

The applicant has surprisingly discovered that a highly flexible, mechanically stable, breathable, especially gas- and/or water vapor-permeable functional textile material can be made by combining the microcapsules containing the active ingredient with the textile backing of the functional textile material via an adhesive applied discontinuously to the textile backing. In this way, it is possible to not only provide a very gas-permeable, in particular, air-permeable and/or water vapor-permeable, i.e., an overall very breathable functional textile material with high mechanical strength, but also thanks to the discontinuous glue application one achieves a considerably reduced basis weight and a much improved flexibility and a distinctly improved wearing comfort when it is made into garments. Thanks to the discontinuous glue application, moreover, only a small portion of the surface of the microcapsules is covered, so that the majority of the surface of the microcapsules is freely available for the release or deployment of the active ingredients (i.e., it is not covered with glue), so that the efficiency of the active ingredient is also considerably augmented thanks to the discontinuous glue application.

Further benefits, properties, aspects and features of the present invention will emerge from the following description of a preferred sample embodiment depicted in the drawing.

BRIEF SUMMARY OF THE INVENTION

A functional textile material is disclosed, wherein the functional textile material comprises a textile backing, which is provided with microcapsules, wherein the microcapsules contain at least one active ingredient, and the microcapsules are secured to the textile backing by means of an adhesive applied discontinuously to the textile.

One object of the present invention is to provide an improved textile material for use in protective garments and materials of all kinds.

Related objects and advantages of the present invention will be apparent from the following description.

BRIEF DESCRIPTION OF THE SEVERAL VIEWS OF THE DRAWINGS

FIG. 1 shows a schematic cross section through the layered makeup of a functional textile material according to a preferred sample embodiment of the present invention.

DETAILED DESCRIPTION OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The single figure shows a functional textile material 1 per the invention, wherein the functional textile material 1 contains a textile backing 2. The textile backing 2 is provided or coated with microcapsules 3, which contain at least one active ingredient. According to the invention, the fastening of the microcapsules 3 with the active ingredient to the textile backing 2 is done by an adhesive 4 applied discontinuously to the textile backing 2. One characteristic of the present invention in particular is that the gluing of the microcapsules 3 to the textile backing 2 of the functional textile material 1 is done by discontinuous glue application, especially in the form of individual noncontiguous glue spots (i.e., lying spatially separated from each other or not joined together). The benefits of the discontinuous glue application have already been presented above.

In order to ensure, on the one hand, a good gas- and/or water vapor-permeability and, on the other hand, a good flexibility for the functional textile material 1 of the invention—with good adhesion of the microcapsules 3 to the textile backing 2 at the same time—the adhesive 4—as described above—is applied discontinuously to the textile backing 2, in particular, in the form of noncontiguous, spatially separated glue points 4. The term glue points designates, in particular, very tiny glue droplets or clumps, which are applied to the textile backing 2, and this generally without touching each other; typically, approximately round or oval glue spots are produced with very small two-dimensional breadth, which is why the term glue points is used.

It has proven to be especially beneficial for the spacing of the individual glue points 4 from each other to be not more than 20 times, especially not more than 10 times, the diameter of the glue points 4.

If the diameter of the microcapsules 3 is at least 50 μm, it is beneficial for the diameter of the glue points 4 to be not more than 20 times, especially not more than 10 times, the diameter of the microcapsules 3.

If the glue points are not completely round or are of irregular shape, the diameter refers to the maximum dimension of the area of the glue point in the projection plane. The glue points applied can essentially be the same size or different from each other; advantageously, the same size glue points are applied. In the case of glue points of different size, the aforesaid dimensional specifications for the glue point spacing and the diameter of the glue points refer to the particular largest diameter.

In general, the glue 4 is applied in a quantity such that it covers the textile backing 2 on the whole by at most 30%, especially at most 25%, preferably at most 20%, very preferably at most 15%. In general, the glue 4 covers the textile backing 2 on the whole for 5-30%, especially 10-25%, preferably 10-20%.

In general, the glue 4 can be applied with a basis weight (dry weight) of 5-30 g/m$^2$, especially 5-25 g/m$^2$, preferably 10-20 g/m$^2$, to the textile backing 2.

According to one preferred embodiment, the adhesive 4 is pressed on to the textile backing 2. The imprinting of the textile backing 2 with the glue 4 can be done, e.g., in the form of a regular grid or pattern. Alternatively, the imprinting of the textile backing 2 with the glue 4 can also be done in the form of an irregular, especially a computer-generated grid or pattern; in this case, the imprinting of the irregular grid or pattern should be such as to avoid a formation of channels in the state of use of the textile material 1, especially a so-called Moiré effect. In general, such irregular grids or patterns for the glue application can be calculated and applied with computer control or support (so-called CP or Computer-Point glue grids). This is familiar to the practitioner.

The imprinting of the textile backing 2 with the glue 4 can be done, e.g., by means of a stencil. Advantageously, the clear diameter of the stencils or, more properly speaking, the holes of the stencils through which the glue is applied is 50-1000 μm, especially 100-575 μm, preferably 100-300 μm.

As for the glue 4, all adhesives known to the practitioner and useful for these purposes can be considered. Especially suitable are hot-melt glues, especially reactive or nonreactive hot-melt glues, or also thermoplastic glues.

As for the textile backing 2 of the functional textile material 1 in the present invention, this is generally what is described as a two-dimensional formation, i.e., the textile backing 2 is generally a two-dimensional textile formation. While the corresponding sheet-like structures obviously have thickness, the use of "two-dimensional" herein is intended to describe a relatively thin sheet-like material wherein the primary dimensions are length and width. In particular, the textile backing 2 is selected from the group consisting of fabrics, knitted fabrics, hosiery, scrims, textile composites, fleece and nonwoven material. The textile backing 2 generally has a basis weight of 25-500 g/m$^2$, especially 30-250 g/m$^2$, preferably 35-200 g/m$^2$.

Depending on application, the textile backing 2 can be gas-permeable, especially air-permeable, and/or water-permeable and/or water vapor-permeable. As an alternative to this, the textile backing 2 can also be gas-impermeable, especially air-impermeable, and/or water-impermeable and/or water vapor-impermeable. According to one preferred embodiment, however, the textile backing 2 is gas-permeable, especially air-permeable, and/or water-permeable and/or water vapor-permeable.

As for the microcapsules 3 used, their diameter can vary broadly. In general, the diameter of the microcapsules 3 lies in the range of 1 μm to 5 mm, especially 5 μm to 2 mm, preferably 10 μm to 1 mm, especially preferably 50 μm to 0.8 mm.

Essentially, the microcapsules 3 used in the invention can be present in the form of matrix capsules or in the form of core/shell capsules. One speaks of a matrix encapsulation especially when the active ingredient or ingredients are present in a preferably homogeneous or uniform distribution over the entire microcapsule 3, whereas in a core/shell encapsulation the active ingredient is located on the inside or in the cavity of a capsule shell. Matrix capsules are used especially when there is a need for continuous releasing of the encapsulated active ingredients over a definite period of time, and different release rates can be adjusted by suitable choice of the matrix materials and the particle sizes, while on the other hand core/shell encapsulations require short-term release or, instead, release over a very long period of time. This is familiar to the practitioner as such.

The capsule material of the microcapsules 3, especially the matrix material in the case of matrix capsules or the shell material in the case of core/shell capsules, can be formed, for example, on the basis of organic polymers, organic-inorganic hybrid polymers, or inorganic materials, especially inorganic oxides. This is rather well known to the practitioner as such, so that no further details need to be explained in this regard.

The fixation or fastening of the microcapsules 3 to the textile backing 2 is done generally such that the microcapsules 3 are at least 50%, especially at least 60%, preferably at least 70%, freely accessible, i.e., not covered by glue 4 on their surface. This allows for an especially good release or effectiveness of the encapsulated active ingredients.

The amount in which the microcapsules 3 are applied to the textile backing 2 can vary broadly. Generally, it lies in the range of 5-500 $g/m^2$, especially 10-400 $g/m^2$, preferably 20-300 $g/m^2$, preferably 25-250 $g/m^2$, especially preferably 50-200 $g/m^2$. This ensures, first, that sufficient quantities of the encapsulated active ingredient are present, and second, that the basis weight does not increase too much.

The quantity of active ingredient or ingredients contained in the microcapsules 3 can likewise vary in broad ranges. Generally, the quantity of active ingredient lies in the range of 1-99 wt %, especially 5-90 wt %, preferably 10-80 wt %, especially preferably 25-75 wt %, in reference to the microcapsules 3.

As for the term active ingredients, in the sense of the present invention this designates in particular those substances which—generally occurring or added in relatively small quantities—produce a physiological and/or technical effect. Suitable active ingredients according to the invention can be chosen, in particular, from the group of pharmaceutical and/or medicinal active principles, catalysts and/or catalytically active compounds, chemicals, phase-change materials, as well as mixtures of the aforementioned compounds.

When the functional textile material 1 is used, e.g., to make protective materials, especially protective coveralls for ABC-protection, the microcapsules 3 can contain in particular, as the active ingredient, a catalyst or a catalytically active component; the catalyst or the catalytically active component can be chosen, e.g., from among enzymes and/or metals, preferably copper, silver, cadmium, platinum, palladium, rhodium, zinc, mercury, titanium, zirconium and/or aluminum, especially their ions and/or salts. According to this embodiment, the catalysts or the catalytically active compounds are used in particular in quantities of 0.01-30 wt %, preferably 0.1-20 wt %, especially preferably 1-15 wt %, very preferably 1-10 wt %, in reference to the weight of the microcapsules 3. As used herein, "ABC-protection", refers to protection against atomic, biological, and chemical agents. The "atomic" reference would typically include "radiological". The synonym of "NBC" stands for "nuclear, biological, and chemical".

According to one especially preferred embodiment of the invention, the microcapsules 3 contain, as active ingredient, a so-called phase-change material. Phase-change material in the sense of the invention means in particular a material that is able to store up and/or release thermal energy in the form of latent heat by a phase transformation, especially a change in its state of aggregation, especially reversibly. Suitable phase-change materials according to the invention are chosen, in particular, from the group of paraffins, hydrate salts and polyethylene glycols, preferably paraffins. Examples of suitable hydrate salts are, e.g., $CaCl_2 \cdot 6 H_2O$ and mixtures of hydrate salts with other compounds. In particular, the choice of the phase-change materials used generally depends on two factors, namely, the latent heat that can be stored up by the phase transformation, and the temperature of the phase transformation; it generally holds that the greater the latent thermal energy due to the phase transformation, the more suited the phase-change material in reference to the invention, and this due to the fact that more thermal energy is available to be stored up by the material. The choice of the transition or phase-change temperature of the phase-change material depends on the practical purpose or the destination of the functional textile material 1 of the invention.

Basically, one can use phase-change materials with a solid/solid or solid/liquid or liquid/solid phase transformation—depending on the transition temperature that one wishes to achieve; furthermore, one can likewise use mixtures of phase-change materials with different transition temperatures in the functional textile material 1 of the invention. According to one especially preferred embodiment, one will use a phase-change material with a solid/liquid or liquid/solid phase transition. Thus, the phase-change material is preferably chosen so that it generates warmth or cold and surrenders this to the surroundings at the phase transition, especially at a change in the state of aggregation. This effect is then utilized in the context of the functional textile material 1, in particular, when it is incorporated into articles of clothing. By virtue of incorporating the phase-change materials into the microcapsules 3, the use of the phase-change materials is especially efficient, since these can be integrated directly in the functional textile material 1 with relatively high concentration, even with no additional barrier layers, e.g., without full-surface coatings by which the warmth or cold released by the phase-change material at the phase transition is partly shielded or absorbed.

To protect the microcapsules 3 on the textile backing 2, especially in the state of use, it is advantageous for the microcapsules 3 to be covered or coated on their side away from the textile backing 2 with a textile cover layer 5, especially in the form of a two-dimensional textile formation. To reduce the overall basis weight of the functional textile material 1, the cover layer 5 generally has a lower basis weight than the textile backing 2, especially a basis weight in the range of 5-150 $g/m^2$, especially 10-125 $g/m^2$, advantageously 15-100 $g/m^2$, preferably 20-75 $g/m^2$. In general, the cover layer 5 is in the form of an advantageously air-permeable textile material, especially a two-dimensional textile formation, preferably a fabric, knitted fabric, hosiery, scrim, textile composite, fleece or nonwoven.

If the functional textile material 1 of the invention is intended to be subsequently worked into protective materials, especially for ABC-protection, such as ABC-protection coveralls, it can be advantageous for the functional textile material 1 to contain, furthermore, an adsorbent which adsorbs chemical toxins, in particular, the textile backing 2 is additionally provided or coated with an adsorbent which adsorbs chemical toxins (not shown in the figure). A suitable adsorbent according to the invention is formed, in particular, on the basis of activated charcoal, preferably in the form of activated charcoal pieces or particles and/or in the form of activated charcoal fibers. The adsorbent is secured to the functional textile material 1, especially to the textile backing 2, preferably by means of gluing. Activated charcoal used preferably according to the invention generally has an inner surface (BET) of at least 800 $m^2/g$, especially at least 900 $m^2/g$, advantageously at least 1000 $m^2/g$, preferably in the range of 800-2500 $m^2/g$. In the event that the adsorbent consists of discrete pieces of activated charcoal, preferably in grain or bead form, these generally have a mean diameter of less than 1.0 mm, advantageously not more than 0.8 mm, preferably not more than 0.6 mm, although the mean diameter should be at least 0.1 mm. In the event of activated charcoal fibers, these can be present, in particular, in the form of a two-dimensional formation of activated charcoal fibers, wherein the two-dimensional formation of activated charcoal fibers should have in particular a basis weight of 10-300 $g/m^2$, particularly 20-200 $g/m^2$, preferably 30-150 $g/m^2$ (e.g., fabric, hosiery, scrim or composite material of activated charcoal fibers, especially one based on carbonized and activated cellulose and/or based on a carbonized activated acrylonitrile).

Thanks to the above-described special makeup of the functional textile material 1 of the invention, especially due to the discontinuous glue application, the overall basis weight of the functional textile material 1 of the present invention is relatively low; in general, the functional textile material 1 of the present invention has an overall basis weight of 75-1000 g/m$^2$, especially 100-800 g/m$^2$, preferably 125-500 g/m$^2$.

As described above, the functional textile material 1 is preferably gas-permeable, in particular, air-permeable. Owing to the discontinuous glue application, the gas or air permeability is considerably increased. In general, the gas or air permeability of the functional textile material 1 is at least 50 L·m$^{-2}$·s$^{-1}$, in particular, at least 100 L·m$^{-2}$·s$^{-1}$, advantageously at least 200 L·m$^{-2}$·s$^{-1}$, especially preferably at least 500 L·m$^{-2}$·s$^{-1}$, and it can be up to 10,000 L·m$^{-2}$·s$^{-1}$.

Owing to its special properties, the functional textile material 1 of the present invention also has, in general, a good water vapor flow rate, in particular, of at least 5 L/m$^2$ per 24 h, especially of at least 10 L/m$^2$ per 24 h, advantageously at least 1 L/m$^2$ per 24 h, especially preferably at least 20 L/m$^2$ per 24 h, very preferably at least 25 L/m$^2$ per 24 h.

For special applications, especially in the area of ABC protection, however, it may be necessary to make the functional textile material 1 of the present invention gas-impermeable, especially air-impermeable. For this case, it may be advantageous for the functional textile material 1 of the present invention to also have at least one membrane (not shown in the figure). Such a membrane can be, for example, a so-called climate membrane. In particular, however, this membrane will be at least essentially water and gas-impermeable, yet permeable to water vapor, slowing the penetration of chemical and/or biological toxins and poisons or being at least essentially impermeable to chemical and/or biological toxins and poisons. Such membranes are known in themselves to the practitioner, so that no further explanation is required here. In general, such membranes will be used in the context of the functional textile membrane 1 of the invention with a thickness of 1-500 μm, especially 1-250 μm, advantageously 1-100 μm, preferably 1-50 μm.

Another aspect of the present invention concerns the use of a functional textile membrane of the present invention, as described above, for the making of clothing, as well as protective materials of every kind, especially protective coveralls, protective gloves, protective shoes, protective socks, head protection garments and other articles of protective clothing, and protective covers and sleeping bags, especially for civilian and military purposes, preferably for ABC uses.

According to yet another aspect, the present invention likewise concerns an article of clothing made using the functional textile material of the invention or an article of clothing having a functional textile material according to the present invention. The present invention also concerns protective materials of every kind, especially protective coveralls, protective gloves, protective shoes, protective socks, head protection garments and other articles of protective clothing, and protective covers and sleeping bags, especially for civilian and military purposes, preferably for ABC uses, which are made using a functional textile material according to the present invention or which have a functional textile material according to the present invention.

According to yet another aspect, the present invention concerns the use of a functional textile material according to the present invention to make filters and filter materials of every kind, especially filters and filter materials for removal of toxins, odors, poisons of every kind, especially from air and/or gas flows, such as ABC-protection mask filters, odor filters, surface filters, air filters, especially filters for cleaning room air, adsorptive backing structures and filters for the medical field.

Finally, the present invention concerns filters and filter materials of every kind, especially filters and filter materials for removal of toxins, odors, poisons of every kind, especially from air and/or gas flows, such as ABC-protection mask filters, odor filters, surface filters, air filters, especially filters for cleaning room air, adsorptive backing structures and filters for the medical field, which are made using a functional textile material according to the present invention or which have a functional textile material according to the present invention.

A number of benefits are connected with the present invention, as have been described in detail above. In particular, the special configuration of the functional textile material of the invention allows one to achieve a high air permeability and thus good wearing comfort, while at the same time reliably securing the microcapsules to the functional textile material. Owing to the discontinuous glue application, the functional textile material retains its flexibility. The quantity of microcapsules glued on can be specifically controlled, for example, by the size, the pattern of arrangement, and the number of glue points applied. For example, owing to the use of so-called reactive hot-melt glue systems, the microcapsules can be glued on at near-room-temperature and do not have to be exposed to any UV or other radiation for the reaction of the glue. As an alternative, as described above, one can also use thermoplastic adhesive systems. The functional textile material of the present invention, outfitted with the microcapsules containing an active ingredient, enables many possible applications, in particular, further working up to make textile materials, especially garments.

Further embodiments, modifications and variations of the present invention will be immediately evident to, and possible for, the practitioner upon reading the specification, without thereby leaving the scope of protection of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A functional textile material, the functional textile material comprising a textile backing, which is provided with microcapsules, wherein the microcapsules contain at least one active ingredient, and the microcapsules are secured to the textile backing by means of an adhesive applied discontinuously to the textile backing;

wherein the microcapsules contain a phase-change material as the active ingredient, the phase-change material being a material with solid/liquid phase transition or liquid/solid phase transition; and wherein the textile backing contains an activated carbon adsorbent.

2. The functional textile material according to claim 1, wherein the textile backing is a two-dimensional textile formation with a basis weight of 25-500 g/m$^2$.

3. The functional textile material according to claim 1, wherein the microcapsules are provided with a textile cover layer on the side away from the textile backing.

4. The functional textile material according to claim 3, wherein the textile cover layer is a two-dimensional textile formation.

5. The functional textile material according to claim 1, wherein the gluing of the microcapsules to the textile backing is done by a discontinuous glue application in the form of noncontiguous, spatially separated glue points.

6. The functional textile material according to claim 5, wherein the spacing of the individual glue points from each other is not more than 20 times the diameter of the glue points.

7. The functional textile material according to claim 5, wherein the diameter of the glue points is not more than 20 times the diameter of the microcapsules, provided the diameter of the microcapsules is at least 50 μm.

8. The functional textile material according to claim 1, wherein the glue covers the textile backing on the whole by at most 30%.

9. The functional textile material according to claim 1, wherein the glue covers the textile backing on the whole by 5-30%.

10. The functional textile material according to claim 1, wherein the glue is applied with a basis weight (dry weight) of 5-30 g/m$^2$ to the textile backing.

11. The functional textile material according to claim 1, wherein the glue is pressed onto the textile backing, either in the form of a regular grid or pattern or in the form of an irregular, computer-generated grid or pattern.

12. The functional textile material according to claim 1, wherein the glue is pressed by a stencil onto the textile backing, and the inside diameter of the holes of the stencil for the application of glue is 50-1000 μm.

13. The functional textile material according to claim 1, wherein the microcapsules have a diameter of 1 μm to 5 mm and wherein the microcapsules are in the form of matrix capsules or in the form of core/shell capsules.

14. The functional textile material according to claim 1, wherein the microcapsules are at least 50% freely accessible and wherein the microcapsules are applied in a quantity of 5-500 g/m$^2$ to the textile backing and wherein the microcapsules contain the active ingredient in quantities of 1-99 wt %, in reference to the microcapsules.

15. The functional textile material according to claim 1, wherein the phase-change material is chosen from the group of paraffins, hydrate salts, and polyethylene glycol.

16. The functional textile material according to claim 1, wherein the phase-change material generates warmth or cold or loses such to the surroundings at the phase transition.

17. The functional textile material according to claim 1, wherein the functional textile material has an overall basis weight of 75-1000 g/m$^2$ and wherein the functional textile material is permeable to gas, the gas permeability of the functional textile material being at least 50 L·m$^{-2}$·s$^{-1}$, and the functional textile material has a water vapor flow rate of at least 5 L/m$^2$ per 24 h.

18. A garment containing a functional textile material according to claim 1.

19. Protective materials of every kind, chosen from the group of protective clothing, protective coveralls, protective gloves, protective shoes, protective socks, head protection garments and other articles of protective garments, as well as protective covers and sleeping bags, in which the protective materials have a functional textile material according to claim 1.

20. Filter and filter materials, wherein the filter and filter materials have a functional textile material according to claim 1.

21. A functional textile material, the functional textile material comprising a textile backing, which is provided with microcapsules, wherein the microcapsules contain at least one active ingredient, and the microcapsules are secured to the textile backing by means of an adhesive applied discontinuously to the textile backing;
    wherein the microcapsules contain a phase-change material as the active ingredient, the phase-change material being a material with solid/liquid phase transition or liquid/solid phase transition;
    wherein the phase-change material generates warmth or cold or loses such to the surroundings at the phase transition;
    wherein the gluing of the microcapsules to the textile backing is done by a discontinuous glue application in the form of noncontiguous, spatially separated glue points, and spacing of the individual glue points from each other being not more than 20 times the diameter of the glue points and the diameter of the glue points being not more than 20 times the diameter of the microcapsules, provided the diameter of the microcapsules is at least 50 μm, and the glue covering the textile backing on the whole by at most 30%;
    wherein the fixation or fastening of micro capsules is done such that the microcapsules are at least 50% freely accessible; and
    wherein the textile backing moreover contains an activated carbon adsorbent in the form of activated charcoal pieces or particles and/or in the form of activated charcoal fibers, which adsorbs chemical toxins, the adsorbent being secured to the textile backing by means of gluing.

22. The functional textile material according to claim 21, wherein the textile backing is a two-dimensional textile formation with a basis weight of 25-500 g/m$^2$.

23. The functional textile material according to claim 21, wherein the microcapsules are provided with a textile cover layer on the side away from the textile backing.

24. The functional textile material according to claim 23, wherein the textile cover layer is a two-dimensional textile formation.

* * * * *